(12) United States Patent
Loh

(10) Patent No.: US 12,454,415 B2
(45) Date of Patent: Oct. 28, 2025

(54) DEVICE FOR TRANSPORTING OBJECTS

(71) Applicant: Deutsche Post AG, Bonn (DE)

(72) Inventor: Hillar Loh, Niederkassel (DE)

(73) Assignee: Deutsche Post AG, Bonn (DE)

( * ) Notice: Subject to any disclaimer, the term of this patent is extended or adjusted under 35 U.S.C. 154(b) by 168 days.

(21) Appl. No.: 18/230,287

(22) Filed: Aug. 4, 2023

(65) Prior Publication Data

US 2024/0043217 A1 Feb. 8, 2024

(30) Foreign Application Priority Data

Aug. 5, 2022 (DE) ...................... 10 2022 119 786.7

(51) Int. Cl.
*B65G 11/20* (2006.01)
*B07C 3/08* (2006.01)

(52) U.S. Cl.
CPC ............. *B65G 11/203* (2013.01); *B07C 3/08* (2013.01); *B65G 2207/42* (2013.01)

(58) Field of Classification Search
CPC .... B65G 11/20; B65G 11/203; B65G 13/075; B07C 3/08
USPC ........................................ 198/959; 193/35 A
See application file for complete search history.

(56) References Cited

U.S. PATENT DOCUMENTS

| 5,934,438 | A | 8/1999 | Hilerich, Jr. | |
|---|---|---|---|---|
| 7,004,330 | B1 * | 2/2006 | Tew .......................... | B07C 5/18 209/592 |
| 8,684,162 | B2 * | 4/2014 | Cavina .................... | G01G 15/00 177/145 |
| 8,841,565 | B2 * | 9/2014 | Herrmann ............... | B67C 3/287 177/60 |
| 9,004,271 | B2 * | 4/2015 | Fourney ................. | B65G 17/08 198/502.2 |
| 9,796,537 | B2 * | 10/2017 | Lang ........................ | B65B 51/00 |
| 9,952,087 | B2 * | 4/2018 | Hendriks ............. | G01G 19/035 |
| 11,311,914 | B2 * | 4/2022 | Xu ............................ | B07C 5/36 |

FOREIGN PATENT DOCUMENTS

| CN | 208585670 U | 3/2019 |
|---|---|---|
| DE | 2805818 A1 | 8/1979 |
| DE | 19642301 A1 | 4/1998 |
| DE | 69509205 A1 | 8/1999 |
| DE | 102008010016 A1 | 9/2009 |

(Continued)

OTHER PUBLICATIONS

US 2006/0289277 A1, Berger et al., (Year: Dec. 28, 2006).*
US 2010/0082151 A1, Young et al., (Year: Apr. 1, 2010).*
US 2024/0246769 A1, Raikar et al., (Year: Jul. 25, 2024).*

*Primary Examiner* — Douglas A Hess
(74) *Attorney, Agent, or Firm* — The Webb Law Firm

(57) ABSTRACT

A device for transporting objects, including a first conveyor element and a second conveyor element. The first conveyor element protrudes beyond the second conveyor element, a first conveying surface being formed by the first conveyor element, and a second conveying surface being formed by the second conveyor element. The first conveying element being movable in dependence on the weight of the object to be transported, so that a first object of a first weight is moved on the first conveying surface and a second object of a second weight is moved on the second conveying surface, the second weight being greater than the first weight.

15 Claims, 8 Drawing Sheets

(56) References Cited

FOREIGN PATENT DOCUMENTS

| | | | |
|---|---|---|---|
| DE | 102008014564 A1 | 9/2009 | |
| EP | 0885822 A1 * | 12/1998 | ............. B65G 47/26 |
| EP | 1127812 A1 | 8/2001 | |
| FR | 2283079 A1 | 3/1976 | |
| JP | 2001149867 A | 6/2001 | |
| JP | 2012148850 A | 8/2012 | |
| WO | WO-2015142911 A1 * | 9/2015 | .......... B25J 15/0085 |

* cited by examiner

DEVICE FOR TRANSPORTING OBJECTS

CROSS-REFERENCE TO RELATED APPLICATION

This application claims priority to German Patent Application No. 10 2022 119 786.7 filed Aug. 5, 2022, the disclosure of which is hereby incorporated by reference in its entirety.

BACKGROUND OF THE INVENTION

Field of the Invention

The present invention refers to a device for transporting objects such as, for example, packages, packets, piece goods or mailings. The present invention refers in particular to a device that may be part of a sorter for sorting the objects.

Description of Related Art

As the number of mailings and goods to be transported in the logistics sector, the requirements to the sorting speed also increase. In particular, it is desirable to achieve a high moving speed of the objects during sorting, so as to be able to sort a high throughput of objects. Specifically, when sorting packages, however, there is an additional issue that individual packages may differ and, thus, may for example have a weight between 10 g and 32 kg. Regardless thereof, these objects must be moved in the same manner within sorting. Here, in particular the deceleration if the objects is a challenge, since on the one hand the light objects have to be decelerated slightly, whereas heavy objects have to be decelerated strongly in order to avoid an undesired impact, for example.

Especially when individual sections of the sorter or sorting system are designed as a chute, i.e. the objects are moved essentially by their weight force, it is desirable to decelerate light object slightly or not at all, whereas an excessive acceleration of heavy objects is not desired or a strong deceleration is necessary, respectively.

SUMMARY OF THE INVENTION

Thus, it is an object of the present invention to provide a device for transporting objects, which reliably transports objects of different weights.

The object is achieved with a device as described herein and a sorter as described herein.

The device for transporting objects according to the invention comprises a first conveyor element and a second conveyor element, the first conveyor element protruding beyond the second conveyor element. The first conveyor element forms a first conveying surface and the second conveyor forms a second conveying surface. The first conveying surface is different from the second conveying surface. In particular, the first conveying element protrudes beyond the second conveyor element in a direction perpendicular to the conveying surfaces. In other words, the first conveying surface and the second conveying surface are arranged at different levels, with the first conveying surface being arranged above the second conveying surface. The conveying surfaces form a surface over which the objects are transported or conveyed. Here, according to the invention, the first conveying element is movable in dependence on the weight of the object to be transported, so that a first object of a first weight is moved on the first conveying surface and a second object of a second weight is moved on the second conveying surface, the second weight being greater than the first weight. According to the invention, the first conveyor element is thus adapted to be pressed down be the weight of the object, so that the object is conveyed and transported on the second conveying surface, if its weight is sufficient to press the first conveyor element down. In this respect, a limit value may be defined for the weight from which an object of a weight greater or equal to this limit value is conveyed and transported on the second conveying surface, whereas objects of a weight lower than this limit value are conveyed and transported on the first conveying surface. Thus, the first conveyor element and the second conveyor element respectively provide different conveying surfaces for different objects or objects differing in weight, wherein the respective conveying surfaces may be configured to provide a weight-adapted transport of the objects.

In particular, the first conveyor element and the second conveyor element have different motion resistances, wherein in particular the second conveyor element has a higher motion resistance than the first conveyor element. Light objects, which are conveyed and transported on the first conveyor element, thus experience only a small motion resistance, whereas heavy objects, which press the first conveyor element down and are thus conveyed and transported on the second conveying surface, experience a higher motion resistance and can be decelerated effectively thereby. Here, the motion resistance describes a resistance which, for example, is transmitted on a respective object as a decelerating effect and slows the motion of the object down. The motion resistance may be generated by friction, roller resistance or the like.

The device is preferably a chute. Here, the device is inclined with respect to the horizontal, so that a movement of the objects in the conveying direction occurs substantially due to their gravity. However, this is not necessarily limited to a sliding movement, but includes other forms in which a movement of the objects due to their weight force is possible, such as, for example, roller conveyors or a sliding over lamellae and bristles.

The objects preferably have a weight between 10 g and 32 kg.

Preferably, the device is configured to convey objects that differ in weight.

Preferably, the device is configured to generate a first decelerating effect for objects of a first weight and a second decelerating effect for objects of a second weight. Here, the first weight is lower than a preset limit value and the second weight is higher than the preset limit value. In particular, the first decelerating effect is smaller than the second decelerating effect.

The first conveyor element and the second element are preferably arranged side by side in the conveying direction. Thereby, the first conveyor elements and the second conveyor elements extend along the direction of movement of the objects on the device. As an alternative, the first conveyor element and the second conveyor element are arranged perpendicular to the conveying direction, so that the first conveyor element and the second conveyor element extend transversely across the device and, in particular if a plurality of first conveyor elements and/or a plurality of second conveyor elements are provided, the object is moved alternately over first conveyor elements and second conveyor elements.

Preferably, the first conveyor element and/or the second conveyor element are arranged in V-shape in particular in the conveying direction. Here, the tip of the V-shaped first conveyor element or second conveyor element may be located centrally on the device or be offset from the center. A V-shaped arrangement of the first conveyor elements and/or the second conveyor elements has the effect that the objects can be aligned centrally on the device.

The device preferably comprises a plurality of first conveyor elements and/or a plurality of second conveyor elements. In particular, the first conveyor elements and the second conveyor elements are arranged alternately.

Preferably, the first conveyor element and/or the second conveyor element have a width of less than 10 cm, preferably less than 5 cm, and particularly preferred less than 1 cm. Here, the width refers to the dimension of the smallest extension of the first conveyor element and the second conveyor element. Thus, the first conveyor element and/or the second conveyor element are designed as strips of a corresponding width which either extend along the conveying direction of the device, transversely to the conveying direction or in a V-shape.

Preferably, the width of the first conveyor element and/or the second conveyor element is less than the minimum size of the objects to be transported. It is ensured thereby that the objects do not get between the first conveyor elements and the second conveyor elements and do not cant in the process. Rather, the objects are conveyed uniformly on either the first conveying surface or the second conveying surface, depending on the weight of the object.

Preferably, the first conveyor element protrudes by less than 10 mm, preferably by less than 5 mm, and particularly preferred by less than 2 mm beyond the second conveyor element. The small protrusion ensures on the one hand that objects, which are conveyed on the first conveying surface and rest on the first conveyor element, do not come into contact with the second conveyor element which defines the second conveying surface. At the same time, however, a canting of the objects at the transitions from the first conveyor element to the second conveyor element is reduced or out rightly avoided by the small protrusion of the first conveyor element beyond the second conveyor element.

Preferably, all first conveyor elements are arranged on one level and define the first conveying surface.

Preferably, all second conveyor elements are arranged on one level and define the second conveying surface.

The first conveyor element preferably comprises a spring element, wherein the first conveyor element is adapted to be pressed down to below or to the plane of the second conveying surface against the spring force of the spring element, in particular by the weight of the respective object. Specifically, the pressing occurs perpendicular to the first conveying surface or the second conveying surface. Here, the spring force can be used to adjust the limit value from which an object of a weight equal to or higher than this limit value is moved on the second conveying surface and an object of a weight lower than this limit value is conveyed on the first conveying surface. Specifically, the spring element is a spring, an elastomer or the like.

The device preferably comprises further conveyor elements, the further conveyor elements defining further conveying surfaces. In this context, in particular also the second conveyor element may be movable and comprise, in particular, a spring element, the second conveyor element being adapted to be pressed down against the spring force of the further conveyor element. Here, the spring force of the spring element of the first conveyor element is smaller than the spring force of the spring element of the second conveyor element. Objects of a first weight will thus be transported on the first conveying surface. Objects of a second weight then press the first conveyor element down against the spring force and are thus conveyed on the second conveying surface. Objects of a third weight press the second conveyor element down against the spring force and are thus conveyed on the further conveying surface. In this case, the third weight is higher than the second weight and the second weight is higher than the first weight.

The first conveying element preferably comprises at least one roller or roll. Using this roller or roll, the object can be transported on the first conveying surface. In particular, the first conveyor element comprises a plurality of rollers or a plurality of rolls. Specifically, the first conveyor element comprises a combination of at least one or a plurality of rollers and at least one or a plurality of rolls.

The first conveyor element preferably comprises at least one lamella over which the object slides and is decelerated. In particular, the first conveyor element comprises a plurality of lamellae.

The first conveyor element preferably comprises bristles via which the object can be transported on the first conveying surface. Specifically, the bristles of the first conveyor element have a modulus of elasticity (Young's modulus) selected such that objects of a weight below the limit value are conveyed on the bristles of the first conveyor element, whereas objects of a weight above the limit value bend the bristles and the objects are thus transported on the second conveying surface.

The second conveyor element preferably comprises at least one roller, one lamella, bristles or a sliding surface. If the second conveyor element comprises at least one roller, the motion resistance generated by the roll resistance of the second conveyor element is greater than the motion resistance (frictional resistance, roll resistance) of the first conveyor element. If, in this case, the second conveyor element is designed as a lamella or bristles, the lamellae or bristles may be of a material that has a higher friction and thus generates a greater motion resistance than the first conveyor element. If the second conveyor element is designed as a sliding surface, the sliding surface can be made of a material with a high frictional resistance such as, for example, rubber, so that the friction of the sliding surface generates an efficient deceleration effect for objects of a high weight which are transported on the second conveyor element.

The first conveyor element preferably comprises first bristles of a first length and the second conveyor element comprises bristles of a second length, the first bristles having a Young's modulus that is smaller than the Young's modulus of the second bristles. Here, the first length is greater than the second length, so that the first bristles protrude beyond the second bristles. Light objects are thus conveyed on the first bristles of the first conveyor element. However, because of the Young's modulus, heavy objects bend the first bristles, so that the heavy object is conveyed on the second bristles.

Preferably, the first bristles and the second bristles are made of a material or are surrounded by a material that generates a motion resistance, in particular by friction. Here, the material of the first bristles and/or the material of the second bristles is chosen such that the motion resistance generated by the first bristles is smaller than the motion resistance generated by the second bristles.

Preferably, third bristles of a third length may be provided, the third length being smaller than the second length and the third bristles having a higher Young's modulus than the second bristles, so that with heavy objects, the first bristles, as well as the second bristles can be bent, and the heavy object is conveyed on the third bristles. Further bristles and conveyor elements may be provided to provide a gradation for objects of different weight. Here, the third bristles may in turn comprise a material that generates an even greater motion resistance than the second bristles.

The first bristles and the second bristles are preferably arranged side by side, as described above with respect to the first conveyor element and the second conveyor element. As an alternative, the first bristles and the second bristles are distributed across the conveying surface.

The present invention further relates to a sorter for sorting objects which comprises a device as described above. Such a sorter or sorting system is a logistics sorting and distribution system. Here, the sorter may comprise more than one device described above. The devices according to the invention can be of identical or different design.

BRIEF DESCRIPTION OF THE DRAWINGS

In the following, the invention is described in more detail by means of preferred embodiments with reference to the accompanying drawings.

The terms Fig., Figs., Figure, and Figures are used interchangeably in the specification to refer to the corresponding figures in the drawings.

In the drawings:

FIG. 1 is a schematic illustration of the present invention,

FIG. 2A is a detail of an embodiment of the present invention,

FIG. 2B is a detail of an embodiment of the present invention,

FIG. 2C is a detail of an embodiment of the present invention,

FIG. 3 is a sectional view of the present invention,

FIG. 4A is a sectional view of the present invention with a light object,

FIG. 4B is a sectional view of the present invention with a heavy object,

FIG. 5A shows a further embodiment of the present invention,

FIG. 5B shows a further embodiment of the present invention,

FIG. 6A shows a further embodiment of the present invention with a light object, FIG. 6B shows the embodiment of FIG. 6A with a heavy object, FIG. 6C shows the embodiment of FIG. 6A in a first configuration, and FIG. 6D shows the embodiment of FIG. 6A in a further configuration.

DESCRIPTION OF THE INVENTION

Figure 1:
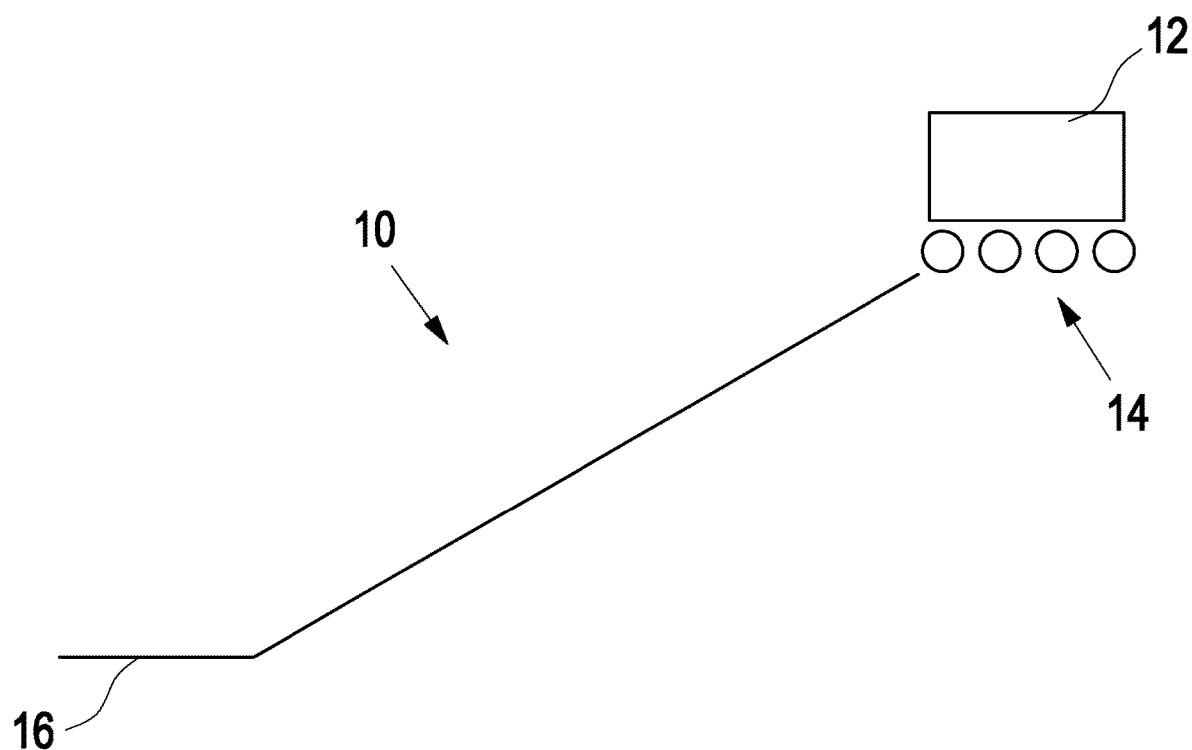

The device according to the invention illustrated in FIG. 1 can be a part of a sorter and is designed, as illustrated in an exemplary manner in FIG. 1, in particular as a chute. As illustrated in an exemplary manner in FIG. 1, an object 12 is transported over a conveyor belt or a roller conveyor 14 and arrives at the device 10, slides over the device 10 and arrives at a removal site 16. In the process, the object 12 has to be decelerated when it is transported over the device 10, and in doing so, it is necessary that heavy objects are decelerated more than light objects. In particular, light objects must possibly not be decelerated at all, since they might otherwise get stuck in the device 10 and the throughput of objects 12 may be reduced thereby. Preferably, the objects are packages, packets, piece goods or mailings. In particular, the objects 12 transported over the device 10 are different and can thus have a weight between 10 g and 32 kg, for example, which is why a clearly different deceleration effect has to be generated.

Figure 2A:
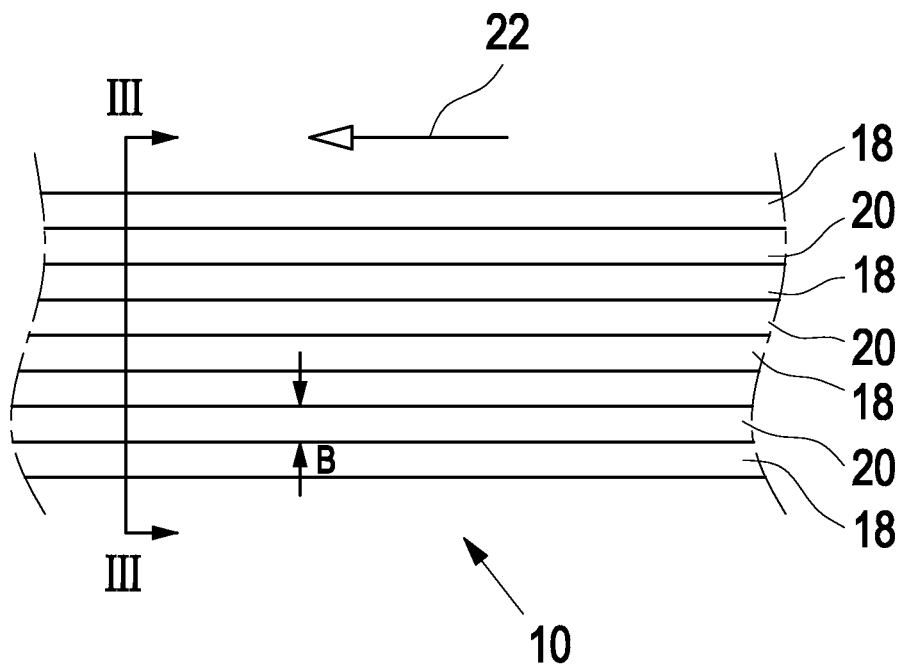
Figure 2B:
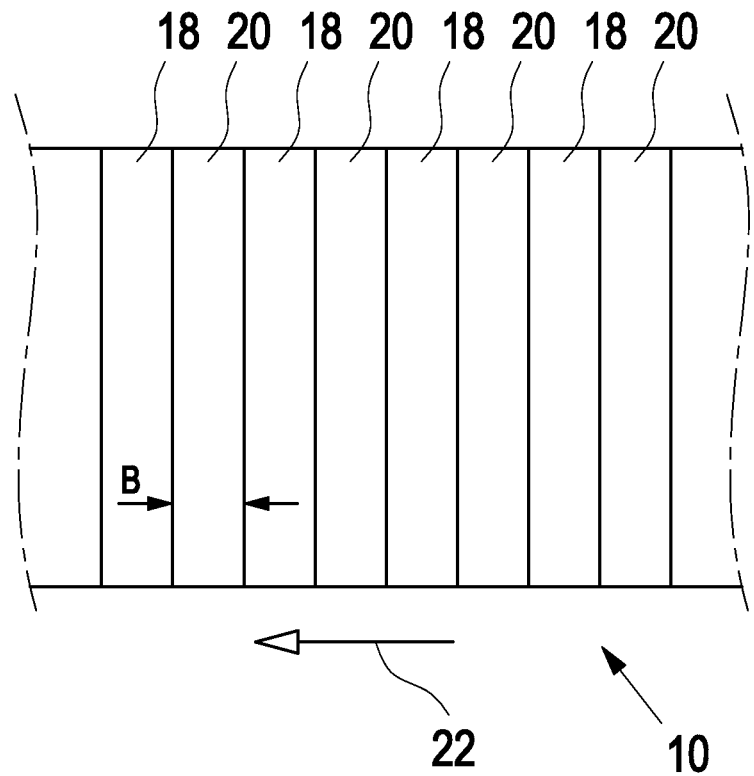
Figure 2C:
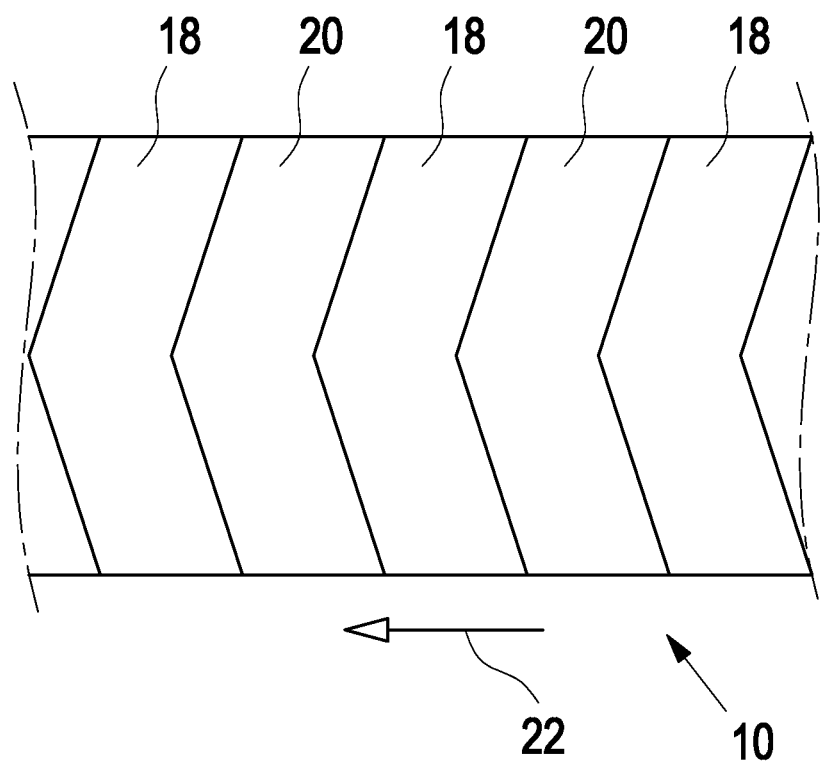
Figure 3:
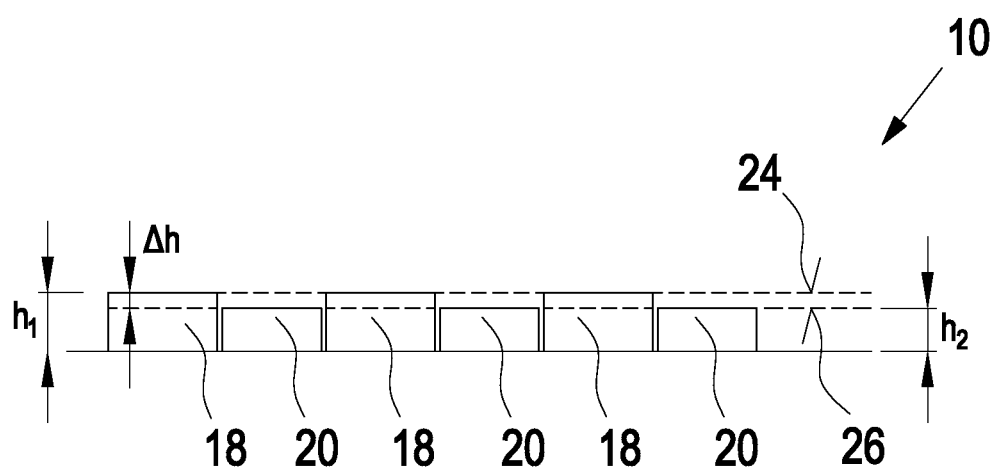

The following refers to FIGS. 2A-C, 3 and 4A-B. The device according to the invention comprises a first conveyor element 18, as well as a second conveyor element 20. As illustrated in FIG. 3, the first conveyor element 18 protrudes beyond the second conveyor element 20. The first conveyor elements 18 can have a height $h_1$. The second conveyor elements 20 may have a height $h_2$. The first conveyor element 18 forms a first conveying surface 24. The second conveyor element 20 forms a second conveying surface 26. As illustrated in the Figures, the device comprises a plurality of first conveyor elements 18 and a plurality of second conveyor elements 20. Here, the distance $\Delta h$ between the first conveying surface 24 and the second conveying surface 26 is less than 10 mm, preferably less than 5 mm, and particularly preferred less than 2 mm. A canting of the objects 12 during the transition from the first conveyor element 18 to the second conveyor element 20 is reduced because of the small distance $\Delta h$.

As illustrated in FIGS. 2A and 2B, the first conveyor elements 18 and the second conveyor elements 20 can be arranged along the conveying direction 22. In particular, the first conveyor elements 18 and the second conveyor elements 20 are arranged alternately. As an alternative, illustrated in FIG. 2B, the first conveyor elements 18 and the second conveyor elements 20 are alternately arranged perpendicular to the conveying direction 22. As an alternative, illustrated in FIG. 2C, the first conveyor elements 18 and/or the second conveyor elements 20 are V-shaped, with the tip of the V-shaped conveyor elements pointing in the conveying direction 22.

The present invention is not limited to the exact number of first conveyor elements 18 and second conveyor elements 20 illustrated in FIGS. 2A-4B. It is also possible to deviate from the alternating arrangement of the first conveyor elements 18 and the second conveyor elements 20, if need be. In particular, further conveyor elements can be provided which, in particular, define further conveying surfaces.

The width B of the conveying elements can be chosen the same for the first conveyor elements 18 and the second conveyor elements 20. As an alternative, all first conveyor elements 18 may have the same width B. As an alternative or in addition, all second conveyor elements 20 may have the same width B. As an alternative or in addition, all first conveyor elements 18 and all second conveyor elements 20 have the same width B. In this context, the width B is defined as the shortest dimension of the respective conveyor elements. The first conveyor elements 18 and the second conveyor elements 20 form strips. Specifically, the width of the first conveyor elements 18 and/or the second conveyor elements 20 is less than 10 cm, preferably less than 5 cm, and particularly preferred less than 1 cm. In particular, the width B is selected based on the smallest objects to be conveyed. In particular, the width B is smaller than the smallest dimension of the objects to be conveyed, so that an undesired canting of the objects between the first and second conveyor elements 18, 20 is just avoided.

Figure 4A:
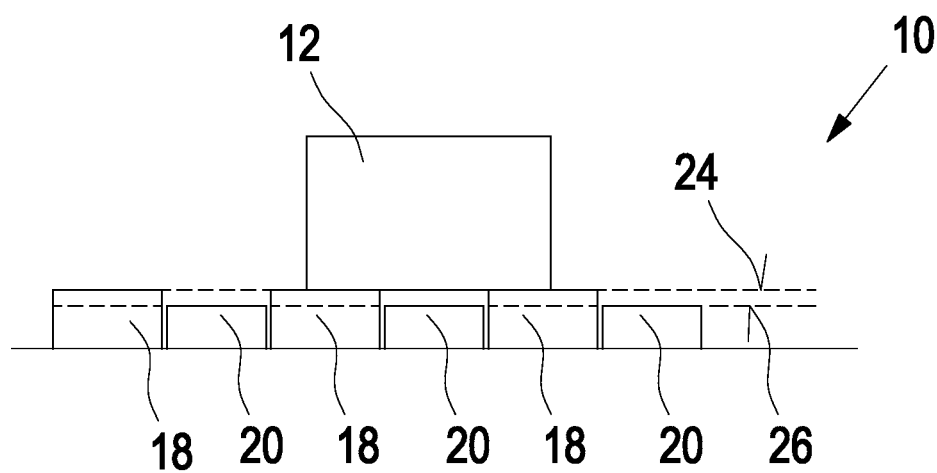
Figure 4B:
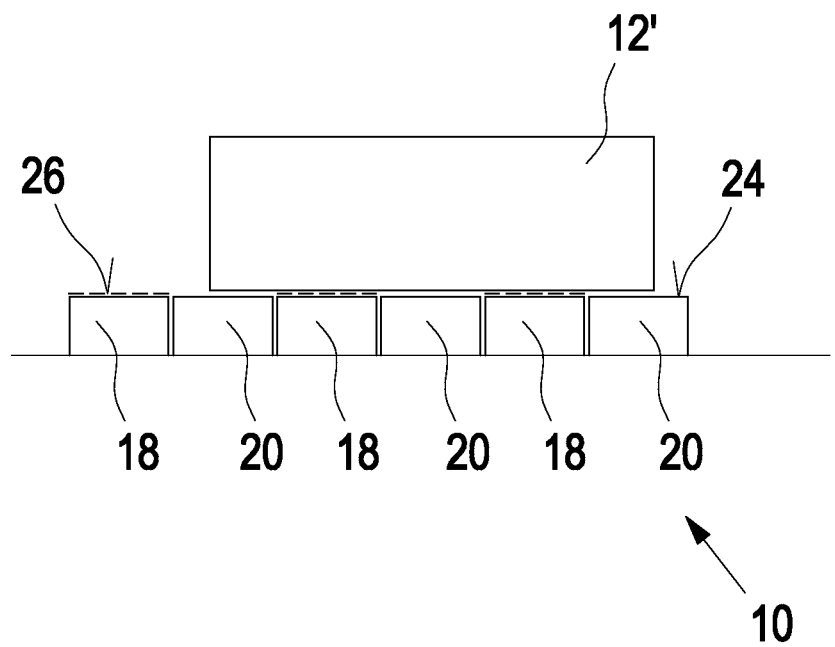

FIGS. 4A and 4B illustrated the operating principle of the present invention. Here, the first conveyor elements 18 are movable and can in particular be pressed down due to the weight of the object 12. In FIG. 4A, a light object 12 is transported along the device 10. In this instance, the object 12 only rests on the first conveyor elements 18 and is thus conveyed on the first conveying surface 24. The object 12 is not in contact with the second conveyor elements 20, which are arranged at the level of the second conveying surface 26. Here, the object 12 of FIG. 4A has a weight lower than a preset limit value. In FIG. 4B, the object 12' has a weight greater than or equal to the preset limit value. The greater weight presses the first conveyor elements 18 down in a direction perpendicular to the first conveying surface 24 or the second conveying surface 26. Thereby, the first conveyor elements 18 are arranged at the level of the second conveying surface 26 or below the same. The heavy object 12' thus comes into contact with the second conveyor elements 20 and is transported along the device 10 via the second conveying elements 20 (either in combination with the first conveyor elements 18 or not). Here, a different motion resistance can be generated by the second conveying elements 20 to act on the heavy object 12', e.g. by increasing the friction or by increasing a roll resistance, so that a greater deceleration effect is exerted on the heavy object 12' than on the light object 12 which is moved on the first conveying surface 24 over the first conveyor elements 18.

Figure 5A:
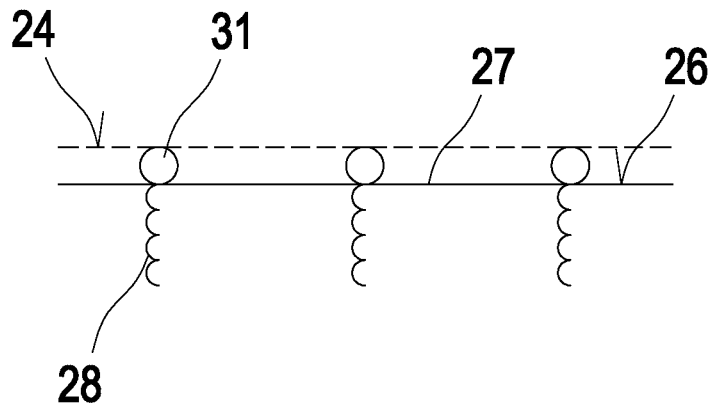

Reference is made to the embodiment in FIG. 5A. Here, the conveyor elements are designed as rollers. The rollers 31 define the first conveying surface 24. A second conveying surface 26 is formed by the second conveyor elements which are designed as a sliding surface 27. The rollers 31 are connected to spring elements 28 which can be pressed down by the weight of the object to be transported. From a weight of the object that is equal or higher than a preset limit value, the object comes into contact with the sliding surface on the second conveying surface. Thereby, the friction of the sliding surface 27 takes effect and the deceleration effect on the heavy object is increased. Light objects do not come into contact with the second conveying surface 26 and thus generate no friction with the sliding surface 27, so that they are transported along the device 10 with a lower motion resistance.

Figure 5B:
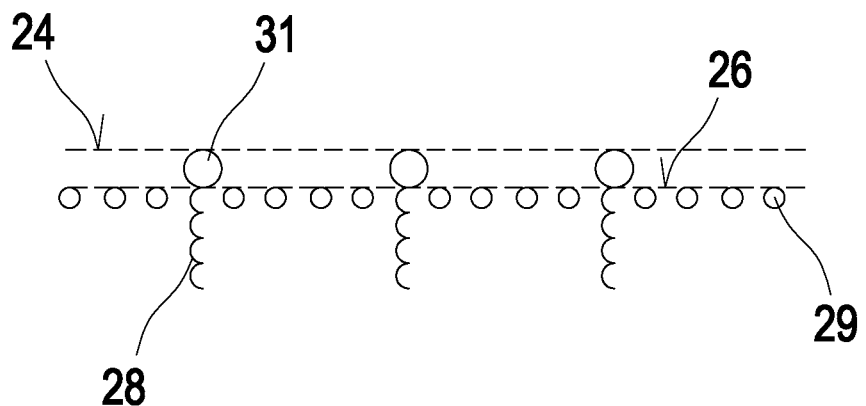

Reference is made to FIG. 5B which, different from FIG. 5A, comprises rollers 29 instead of a sliding surface 27. Here, the rollers 29 may have a higher roll resistance than the rollers 31 of the first conveyor element 18, whereby an efficient deceleration effect is transmitted onto the heavy object upon contact between a heavy object and the rollers 29 of the second conveyor element 20.

Figure 6A:
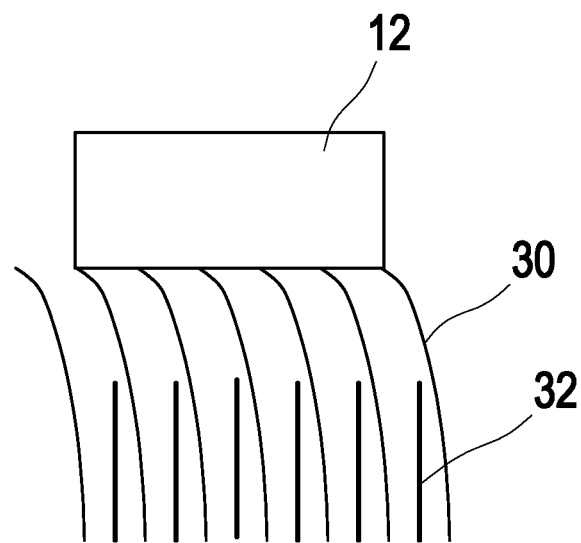
Figure 6B:
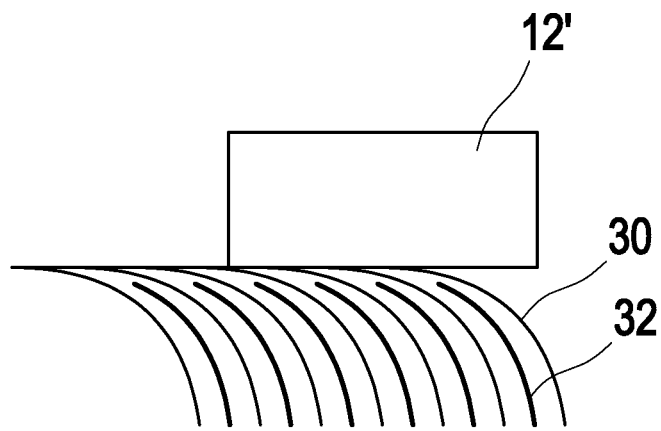
Figure 6C:
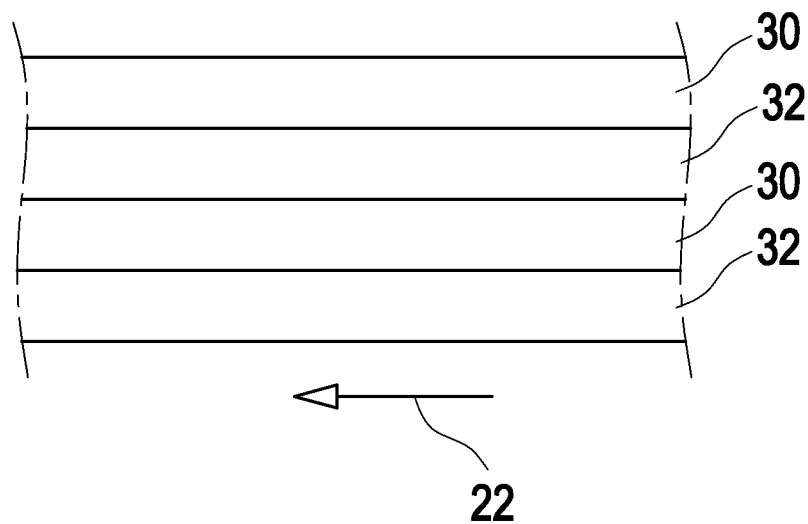
Figure 6D:
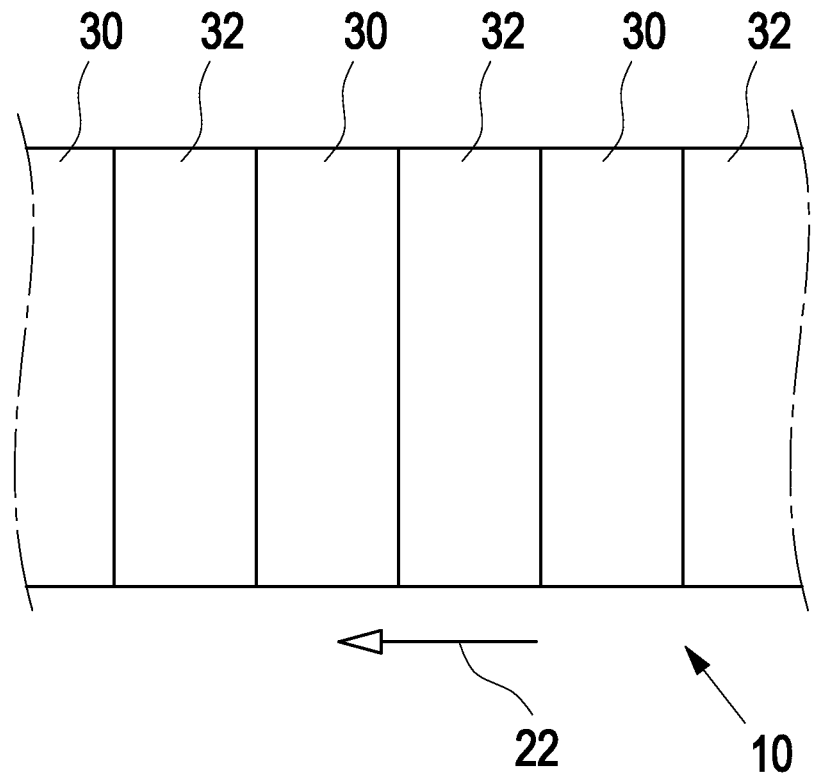

Reference is made hereinafter to FIGS. 6A to 6D. In the embodiments of FIGS. 6A-6C, the first conveyor element 18 is designed as a plurality of bristles 30 having a first length, and the second conveyor element 20 is designed as a plurality of second bristles 32 having a second length, with the first length being greater than the second length. In particular, the first bristles 30 have a smaller Young's modulus than the second bristles 32. A light object 12 with a weight below a preset limit value slides over the first bristles 30 as illustrated in FIG. 6A. According to FIG. 6B, with an object 12' of a weight above this limit value, the first bristles 30 are bent such that the heavy object 12' comes into contact with the second bristles 32. Here, the first bristles 30 and the second bristles 32 can be made of different materials, whereby the friction of an object 12, 12' is less on the first bristles 30 than on the second bristles 32. Lamellae can also be provided instead of bristles. According to FIG. 6C, the first bristles 30 and the second bristles 32 can be arranged in strips along the conveying direction 22. As an alternative, according to FIG. 6D, the first bristles 30 and the second bristles 32 can be arranged in strips perpendicular to the conveying direction 22. As an alternative, the first bristles 30 and the second bristles 32 are distributed across the surface of the device and are, in particular, evenly distributed.

LIST OF REFERENCE NUMERALS 10 device
14 roller conveyor
16 removal site
12 object
12' object
18 first conveyor element
20 second conveyor element
22 conveying direction
24 first conveying surface
26 second conveying surface
27 sliding surface
28 spring element
29 rollers
30 first bristles
31 roller
32 second bristles

The invention claimed is:

1. A device for transporting objects, comprising
   a first conveyor element, and
   a second conveyor element, the first conveyor element protruding beyond the second conveyor element, a first conveying surface being formed by the first conveyor element, and a second conveying surface being formed by the second conveyor element,
   the first conveying element being movable in dependence on the weight of the object to be transported, so that a first object of a first weight is moved only on the first conveying surface without contacting the second conveying surface, and a second object of a second weight is moved on the second conveying surface, the second weight being greater than the first weight.

2. The device according to claim 1, wherein the first conveyor element and the second conveyor element have different motion resistances and, in particular, the second conveyor element has a higher motion resistance than the first conveyor element.

3. The device according to claim 1, wherein the first conveyor element and the second conveyor element are arranged side by side in the conveying direction or perpendicular to the conveying direction.

4. The device according to claim 1, wherein the first conveyor element and/or the second conveyor element are arranged in a V-shape, in particular in the conveying direction.

5. The device according to claim 1, characterized by a plurality of first conveyor elements and/or a plurality of second conveyor elements, the first conveyor elements and the second conveyor elements being in particular arranged alternately.

6. The device according to claim 1, wherein the first conveyor element and/or the second conveyor element have a width of less than 1 cm.

7. The device according to claim 1, wherein the first conveyor element protrudes by less than 2 mm beyond the second conveyor element.

8. The device according to claim 1, wherein the first conveyor element comprises a spring element, the first conveyor element being adapted to be pressed down against the spring force of the spring element.

9. The device according to claim 1, wherein the first conveyor element comprises at least one roller.

10. The device according to claim 1, wherein the first conveyor element comprises at least one lamella.

11. The device according to claim 1, wherein the first conveyor element comprises bristles.

12. The device according to claim 1, wherein the second conveyor element comprises at least one roller, at least one lamella, bristles or a sliding surface.

13. The device according to claim 1, wherein the first conveyor element comprises first bristles of a first length and the second conveyor element comprises second bristles of a second length, the first bristles having a Young's modulus smaller than the Young's modulus of the second bristles.

14. The device according to claim 13, wherein the first bristles and the second bristles are distributed across the conveying surface.

15. A sorter for sorting objects, wherein the sorter comprises at least one device and in particular a plurality of devices according to claim 1.

* * * * *